(12) United States Patent
Bourekas (10) Patent No.: US 7,133,951 B1
(45) Date of Patent: Nov. 7, 2006

(54) ALTERNATE SET OF REGISTERS TO SERVICE CRITICAL INTERRUPTS AND OPERATING SYSTEM TRAPS

(76) Inventor: Philip A. Bourekas, 3258 Delta Rd., San Jose, CA (US) 95135

( * ) Notice: Subject to any disclaimer, the term of this patent is extended or adjusted under 35 U.S.C. 154(b) by 0 days.

(21) Appl. No.: 09/515,358

(22) Filed: Feb. 29, 2000

(51) Int. Cl.
*G06F 13/24* (2006.01)

(52) U.S. Cl. ............... 710/260; 710/261; 710/262; 710/263; 710/264; 710/265; 710/266; 710/316; 710/317

(58) Field of Classification Search ........ 710/260–269, 710/316–317; 712/34, 244
See application file for complete search history.

(56) References Cited

U.S. PATENT DOCUMENTS

| | | | |
|---|---|---|---|
| 5,115,506 A * | 5/1992 | Cohen et al. ............... | 710/267 |
| 5,197,138 A | 3/1993 | Hobbs et al. ............... | 395/375 |
| 5,303,378 A * | 4/1994 | Cohen ......................... | 710/264 |
| 5,317,711 A | 5/1994 | Bourekas et al. ........... | 395/425 |
| 5,369,770 A * | 11/1994 | Thomason et al. ......... | 710/260 |
| 5,440,747 A * | 8/1995 | Kiuchi ........................ | 710/267 |
| 5,465,337 A | 11/1995 | Kong | |
| 5,574,877 A | 11/1996 | Dixit et al. | |
| 5,596,733 A * | 1/1997 | Worley et al. ............... | 712/244 |
| 5,636,363 A | 6/1997 | Bourekas et al. ........... | 395/465 |
| 5,727,227 A * | 3/1998 | Schmidt et al. ............ | 712/36 |
| 5,862,389 A * | 1/1999 | Kardach et al. ............ | 710/266 |
| 5,956,756 A | 9/1999 | Khalidi et al. | |
| 5,987,258 A * | 11/1999 | Daniel et al. ............... | 717/124 |
| 5,996,058 A * | 11/1999 | Song et al. .................. | 712/31 |
| 6,038,661 A * | 3/2000 | Yoshioka et al. | |
| 6,073,226 A | 6/2000 | Cutshall et al. | |
| 6,079,004 A | 6/2000 | Liedtke | |
| 6,425,038 B1 * | 7/2002 | Sprecher ..................... | 710/269 |
| 6,425,039 B1 * | 7/2002 | Yoshioka et al. | |

* cited by examiner

*Primary Examiner*—Rehana Perveen
*Assistant Examiner*—Kim T. Huynh
(74) *Attorney, Agent, or Firm*—Finnegan, Henderson, et al.

(57) ABSTRACT

A processor includes a set of general purpose registers that are used when executing generic tasks and a set of exception registers that is dedicated for servicing specific exceptions. When a task is interrupted with an asserted "fast" exception, the processor automatically diverts the exception to the dedicated exception registers using a dedicated vector. The dedicated vector and exception registers may be reserved for high priority, i.e., critical, exceptions. Because the exception registers are automatically activated for fast exceptions, there is no need to determine the priority of the exception. Further, high priority interrupts and high priority operating system calls (traps) may have different dedicated vectors and the set of exception registers may have a portion allocated for servicing interrupts and another portion allocated for servicing operating system calls. With the use of a dedicated vector or dedicated vectors, there is no need for software to decode the fast exception. Advantageously, during the servicing of the exception, the values of the exception registers may be modified, without disrupting the state of the interrupted task. Thus, because a set of dedicated exception registers are swapped in for the general purpose registers to service an exception, there is no need for explicit state management prior to or after servicing the exception.

29 Claims, 5 Drawing Sheets

ALTERNATE SET OF REGISTERS TO SERVICE CRITICAL INTERRUPTS AND OPERATING SYSTEM TRAPS

FIELD OF THE INVENTION

The present invention relates to a microprocessor based electronic system and in particular to servicing exceptions including hardware interrupts and operating system calls.

BACKGROUND

Conventional digital computers execute tasks by executing sequences of related instructions that access or modify the contents of a set of registers and memory cells. Occasionally, during execution of a sequence of instructions an exception occurs, such as an interrupt or operating system calls (traps), which requires the operating system to immediately respond. A processor may receive exceptions from a number of sources, including translation lookaside buffer (TLB) misses, arithmetic overflows, and I/O interrupts. Conventionally, when an exception is detected, the normal sequence of instructions is suspended while the processor deals with the exception. The use of exceptions and exception processing is well known in the art of computer architecture.

Figure 1:
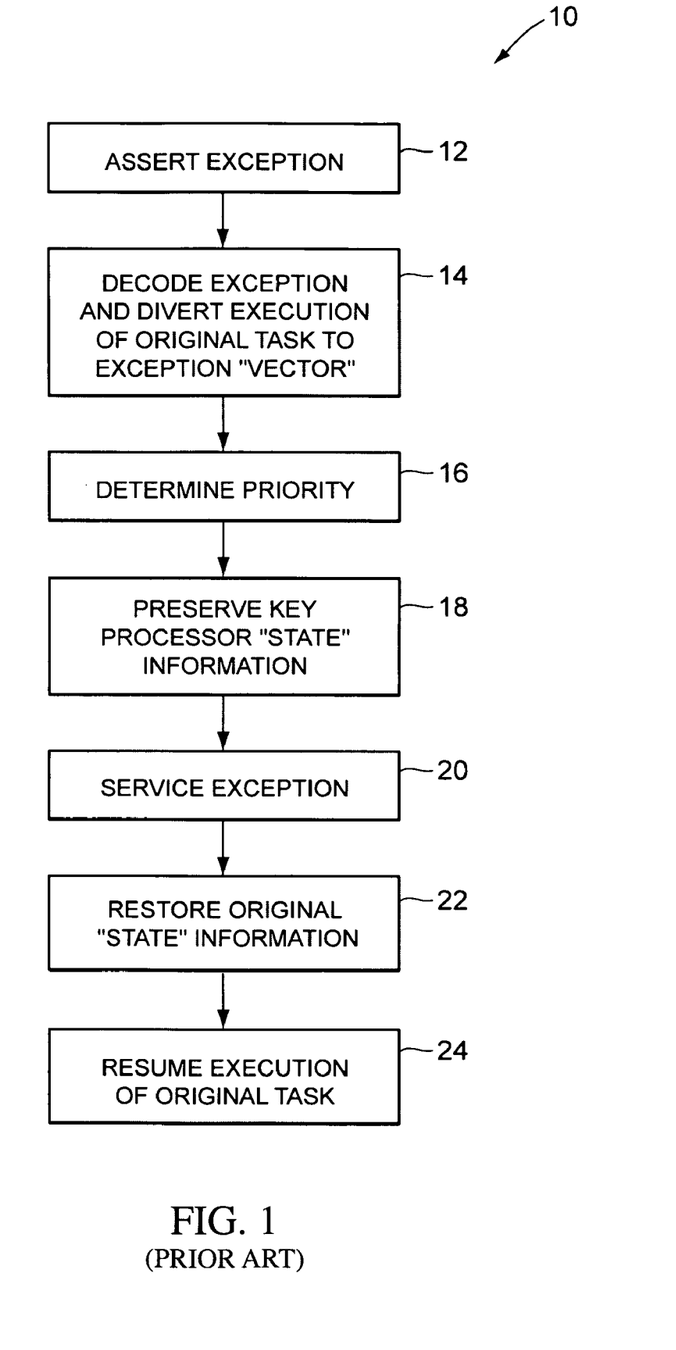
FIG. 1 shows a flow chart of a conventional process used to service to an exception.

FIG. 1 is a flow chart 10 of processing an exception in a conventional manner. As shown in FIG. 1, when an exception is asserted (block 12) the exception is decoded and execution diverted (using an exception "vector") to a new location that is designated for handling exceptions (block 14). The processor and/or system software must determine the priority of the exception (block 16) particularly if there are multiple exceptions, in which case the highest priority must be dealt with first. The execution of the original task is suspended and the key processor "state" information must be preserved in main memory (block 18) so that once the exception is serviced, the original task may be resumed. The exception is then serviced (block 20). After the exception is serviced, the processor must restore the original "state" information that was earlier preserved (block 22). The execution of the original task is then resumed (block 24).

Typically, in an embedded real-time system, a number of exceptions, with varying levels of importance, i.e., priority, must be managed. As can be seen in FIG. 1, decoding the exception, determining priority, and preserving the state of the system, present a large amount of overhead in servicing exceptions.

One conventional strategy implemented in processors to speed operation, typically when handling multiple exceptions, is called "nesting". To reduce the amount of time spent in prioritization of multiple interrupts, a processor may use a fixed set of priorities. When a higher priority interrupt is signaled (higher than the current executing program), the processor suspends execution and automatically preserves the entire processor state into an area of memory referred to as the "stack". Unfortunately, as processors have developed, the amount of state information has grown such that saving all processor state, regardless of need, is an undue burden. Consequently, stacking in current processors actually degrades performance due to the amount of state information that must be stacked.

Another technique employed to service exceptions includes register windows, which help minimize the time spent doing "context switching." In a register window approach, windows are made available by periodically allocating a set of registers from a larger physical set when a subroutine is called or an exception is signaled. Unfortunately, depending on the number of physical registers and the program, register "spills" may occur during which there are not enough registers to handle the exception. Consequently, prior windows have to be written into main memory to create a new window resulting in a degradation in the performance.

Thus, what is needed is a technique to minimize the overhead associated with servicing an exception to speed the handling of exceptions and to separate especially critical exceptions from normal priority exceptions.

SUMMARY

In accordance with an embodiment of the present invention, a processor includes a set of general purpose registers and a set of "alternate", but otherwise general purpose, exception registers, e.g., eight registers, that are switched for a subset of general purpose registers and are used while servicing specific exceptions. The set of exception registers is dedicated for servicing high priority, i.e., critical, exceptions. The processor may provide a dedicated vector, which, when used, also turns on the set of exception registers for an asserted exception. Software conventions, such as an API, can allocate different portions of the set of exception registers or different sets of exception registers for servicing different types of exceptions, such as interrupts operating system calls (traps), while separate dedicated vectors may be used for the interrupts and the operating systems calls.

In one embodiment, select logic circuits may be used to enable and disable the general purpose registers and the exceptions registers. Thus, for example, a select logic circuit coupled to the exception registers may receive an exception register active bit from the opcode of the instruction, while a select logic circuit coupled to the general purpose registers may receive an inverted exception register active bit from the opcode. Thus, one of either the general purpose registers and the exception registers will be enabled and one disabled. The select logic circuits may also receive the same register address bits from the opcode of the instruction.

In accordance with another embodiment of the present invention, a method of interrupting the execution of a task for servicing an exception in a processor, includes asserting an exception, diverting execution to a vector address and activating logic to use the exception alternate registers, rather than general purpose registers, servicing the exception using the set of exception registers and swapping out the exception registers for the general purpose registers before resuming execution of the original task. Because servicing the exception now utilizes the exception registers without disrupting the state of the interrupted task, there is no need for explicit state management prior to servicing the exception. The processor may automatically activate exception registers and use dedicated vectors with the exception registers. The dedicated vector may be used for high priority, i.e., critical, exceptions, while another vector, for exceptions which use the general purpose registers, is used for exceptions with a lower priority. In addition, the method may include providing separate dedicated vectors for high priority interrupts and high priority operating system calls, while another vector is used with the general purpose registers for lower priority exceptions.

Because the exception registers are automatically activated for fast exceptions, there is no need to determine the priority of the exception. With the use of a dedicated vector or dedicated vectors for interrupts and operating system calls, there is no need to decode the exception. Advantageously, during the servicing of the exception, the values of the exception registers may be modified, without disrupting the state of the interrupted task. Thus, because a set of dedicated exception registers are swapped in for the general purpose registers to service an exception, there is no need for explicit state management prior to and subsequent to servicing the exception.

DETAILED DESCRIPTION

A processor, in accordance with an embodiment of the present invention, speeds the service of high priority, i.e., critical, exceptions, such as interrupts and operating system calls (traps), by providing an alternate set of registers for the service routine to use while servicing the exception. By providing alternate registers to service the exception, the entire CPU instruction set is available to service the exception and there is no overhead for state preservation or recovery at the beginning and end of servicing the exception. Moreover, if the exception is one in a series, such as receiving cells in a packet, intermediate results, e.g., for a current subset of the packet, do not need to be pushed to memory and other information, while other incoming parameters and outgoing results, can be made available to the exception service routine and to the rest of the software environment, without operating system traps or exceptions.

A processor, in accordance with an embodiment of the present invention, divides exceptions into two levels: "normal" for lower priority exceptions, and "fast" for high priority or critical exceptions. Normal exceptions are dealt with in a conventional way, such as using a conventional software approach. Software decodes the current exception, applies its own prioritization rules and relies on software to save as little or much of the state information as required for the current exception.

A fast exception has a higher priority than a normal exception. In other words, if both are asserted at the same time, the fast exception is recognized and serviced first. The servicing of normal exceptions is not pre-empted by fast exceptions. Fast exceptions are serviced with a set of exception registers that automatically replace at least a subset of general purpose registers and a dedicated vector is used to begin exception service. Thus, fast exceptions are automatically separated from normal exceptions.

Figure 2:
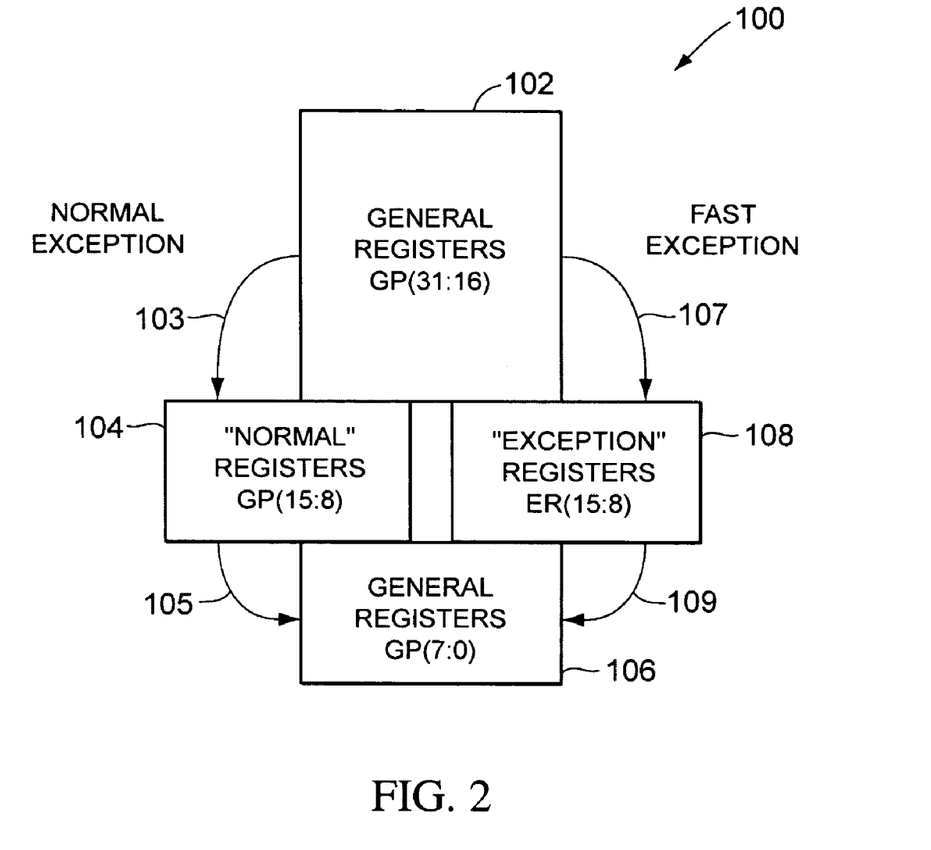
FIG. 2 is a block diagram of register files showing the programmers view of the processor register file under the invention while servicing the high priority, i.e., critical, exceptions and/or normal exceptions in accordance with an embodiment of the present invention.

FIG. 2 is a block diagram showing the programmers view of the processor register files 100 showing the servicing of fast exceptions and normal exception in accordance with an embodiment of the present invention. While executing tasks and during operation on "normal" exceptions, general purpose registers GP(31:16) 102, GP(15:8) 104, and GP(7:0) 106 are used, as indicated by arrows 103 and 105.

In accordance with an embodiment of the present invention, however, a set of dedicated fast exception registers ER(15:8) 108 are included as an alternate to the set of general purpose registers GP(15:8) 104. Thus, during a fast exception, general purpose registers GP(15:8) 104 are swapped out for exception register ER(15:8) 108, as indicated by arrows 107, 109.

With the use of a set of fast exception registers ER(15:8) 108, there remains a number, e.g., 24, of other registers available so that the exception handler, operating system, and user tasks can share data without being required to go to memory to obtain the rest of the system state. In an embodiment of the present invention, interrupts and traps may be allocated to different portions of the set of exception registers, e.g., half the exception registers may be allocated to the fast interrupts while the other half of the exception registers are allocated to the fast traps. Alternatively, different sets of exception registers may be used for fast interrupts and fast traps.

It should be understood that the specific number of registers shown in FIG. 2, including the number of exception registers ER(15:8) 108 is illustrative, and any number of registers may be used. Further, if desired, multiple alternate sets of exception registers may be used. Thus, multiple exceptions may be mapped to multiple exception registers, e.g., exception (1) is mapped to a first set of alternate exception registers, exception (2) is mapped to a second set of alternate exception registers, etc . . . . Moreover, separate interrupt and trap vectors may be associated with each alternate set of exception registers. Cache locking may also be used to hold exception vectors. Cache locking is a method of marking certain cache lines such that they are not selected for replacement during cache refill.

Because a set of alternate registers are swapped in during high priority exceptions, there is no need for explicit state management. In other words, the state of general purpose registers GP(15:8) 104 is maintained in those registers while the exception is serviced in the exception registers ER(15:8) 108. The exception handler can freely modify the values in the exception registers without disrupting the state of the interrupted task that is present in the general purpose registers 104. Further, because the same set of alternate general purpose registers are used each time a fast exception is signaled, there is no possibility of a register window spill, and results can be preserved between exceptions. Thus, the operating system can use the values in the exception registers as intermediate results, thereby minimizing memory reads and writes at the beginning and end of exceptions, which are relatively costly in terms of performance.

The alternate exception registers ER(15:8) 108 may be substituted out, and general purpose registers GP(15:8) 104 back in, by a single instruction at the end of the exception handling. Consequently, the code that is required to explicitly restore the operating state of the register file at the end of the exception and to resume execution of the original task is eliminated.

In addition, because a dedicated vector is used for fast exceptions, which have a higher priority than normal exceptions, fast exceptions are automatically separated from normal exceptions. Consequently, there is no need to decode the fast exception or to determine its priority.

Figure 3:
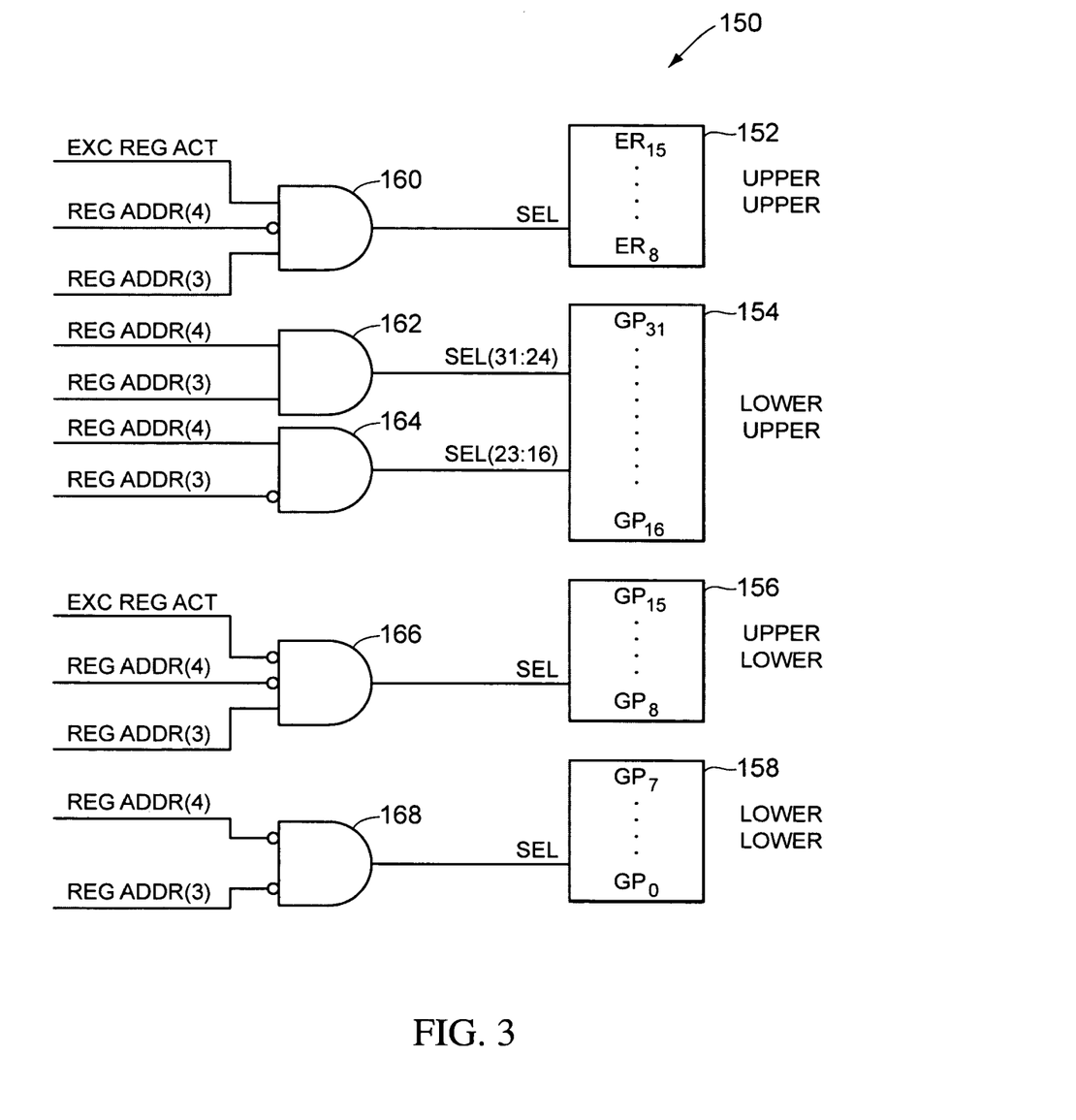
FIG. 3 shows a block diagram of a circuit, in accordance with an embodiment of the present invention, using a set of general purpose registers and an alternate set of dedicated exception registers.

FIG. 3 shows a block diagram of a circuit 150, in accordance with an embodiment of the present invention, using exception registers 152, labeled as upper upper register bank 152 and general purpose registers 154, 156, and 158, labeled as lower upper register bank 154, upper lower register bank 156, and lower lower register bank 158, respectively.

Each instruction can specify up to three registers; and a processor can be multiple issue (multiple instructions per cycle). Commonly, the processor register file supports numerous simultaneous read and/or write accesses. For example, a dual issue machine would need to support four read accesses and two write accesses per clock cycle into the register file, while control logic keeps the multiple writes, or a write/read pair, from interfering with each other. Each read or write "port" has logic to select the physical register that it is using. Thus, each port has "select" logic, which utilizes a register address field to pick the register out of the register "file". Thus, as shown in FIG. 3, registers banks 152, 154, 156, and 158 are each selected, via a port SEL that is coupled to a select logic, shown in FIG. 3 as AND logic gates. Logic gate 160 controls the selection of upper upper register bank 152, i.e., the exception register, while logic gates 162 and 164 control the selection of lower upper register bank 154, logic gate 166 controls the selection of upper lower register bank 156, and logic gate 168 controls the selection of lower lower register bank 158. Low order bits of RegAddr pick the specific register within the bank. Each logic gate 160, 162, 164, 166, and 168 receives on input terminals (some of which are inverted, as shown in FIG. 3) the third register bit (RegAddr (3)) and the fourth register bit (RegAddr(4)). As indicated in FIG. 3, logic gate 162 enables registers 31 through 24 of upper lower register bank 154, while logic gate 164 enables registers 23 through 16 of upper lower register bank 154.

The register bits RegAddr(3) and RedAddr(4) come from the opcode for the instruction being executed. Thus, for example, the architecture of circuit 150 supports a "3 operand" format, which is well understood by those of ordinary skill in the art, whereby an opcode can specify two source registers and a destination (e.g. reg(a)<-reg(b) op reg(c), where a, b, and c are register numbers (not necessarily different . . . )). Thus, the opcodes contain the specification of the register numbers, or register address. If desired, some processor architectures or implementations may implement performance techniques to cause the specification of the register numbers, or register address, that finally reach a register file to come from some buffering or control store, rather than the current instruction entering the pipeline.

In accordance with the present invention, circuit 150 must also factor in whether the alternate exception registers, i.e., upper upper registers bank 152, are currently active. Thus, logic gates 160 and 166, which control the upper upper register bank 152 and upper lower register bank 156, respectively, also receive an exception register active bit (ExcRegAct). As shown in FIG. 3, logic gate 166, which controls the general purpose register upper lower bank 156, receives an inverted exception register active bit (ExcRegAct), and thus is disabled if the exception register active bit is high. Logic gate 160, which controls exception register upper upper bank 152, however, receives the exception register active bit (ExcRegAct), and thus is enabled when the exception register active bit is high. Logic gates 162, 164, and 168 do not receive the exception register active bit (ExcRegAct) because the lower upper register bank 154 and lower lower register bank 158 do not care if the exception register is active. The exception register active bit (ExcRegAct) is set by a fast exception and cleared when the exception is returned from.

Table 1 below summarizes the logic of circuit 150, where an "X" indicates "do not care".

TABLE 1

| ExcRegAct | RegAddr (4) | RegAddr (3) | Physical Register | Select Activated |
|---|---|---|---|---|
| X | 0 | 0 | GP[7:0] 158 | Lower Lower |
| 0 | 0 | 1 | GP[15:8] 156 | Upper Lower |
| X | 1 | 0 | GP[23:16] 154 | Lower Upper |
| X | 1 | 1 | GP[31:24] 154 | Lower Upper |
| 1 | 0 | 1 | ER[15:8] 152 | Upper Upper |

It should be understood that the function of circuit 150 may be implemented in other ways. For example, an out of order architecture may implement a technique called "register renaming", whereby the current location of a given physical register may be dynamically moved in a larger, "virtually addressed" register file. In that case, the logic shown in FIG. 3 would be used to properly determine the virtual name of interest, and then provide a select signal as an input to the mapping logic for the register access, where an exception register active bit would choose an alternative virtual name from that chosen if the exception register is not active.

Figure 4:
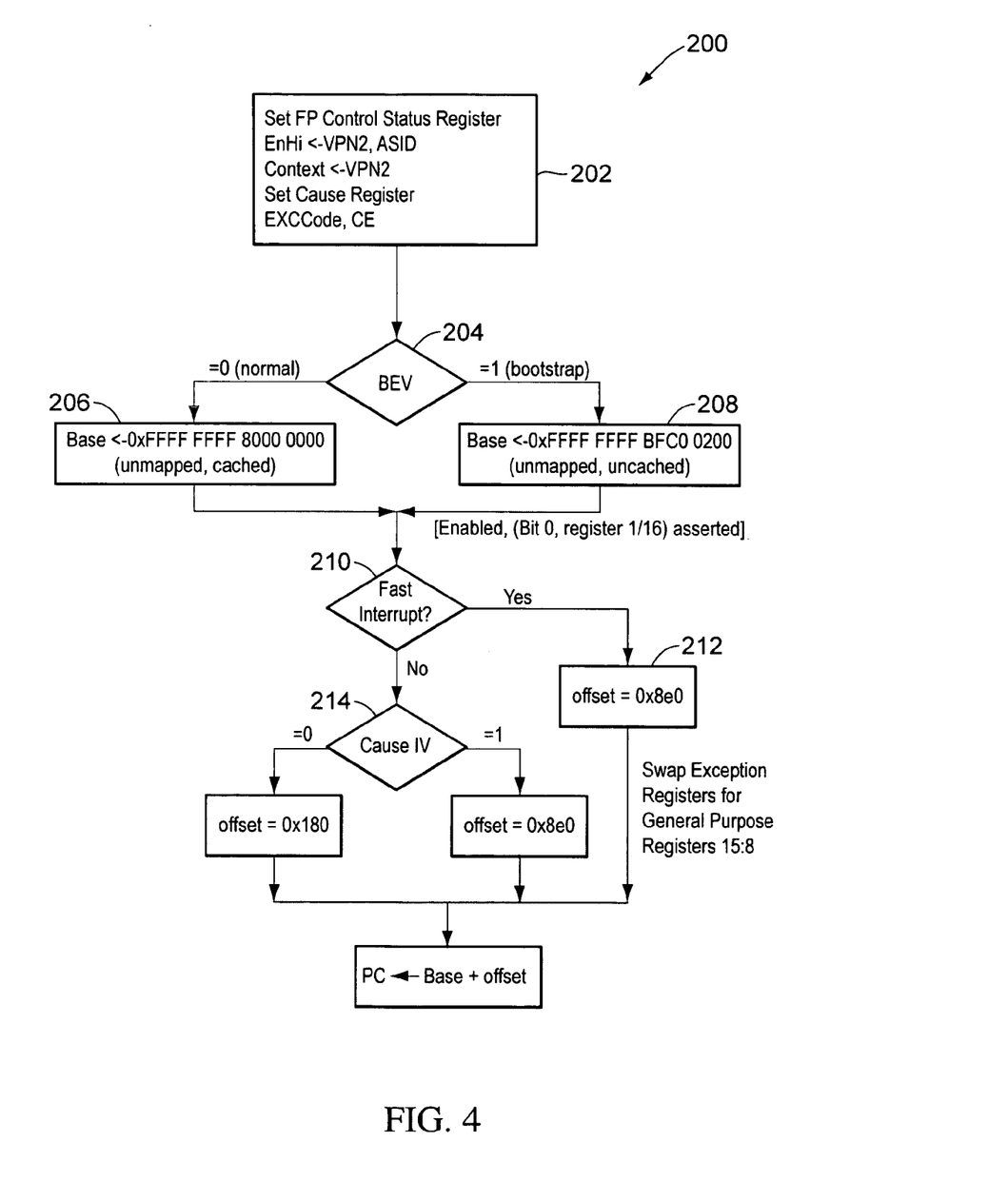
FIG. 4 is flow chart showing the process of handling an exception in accordance with the an embodiment of the present invention.

Using the alternate set of exception registers, in accordance with the present invention, eliminates many of the conventional steps that must be performed by the system when handling an exception. FIG. 4 is flow chart showing the process 200 of handling an exception in accordance with the present invention. When an exception occurs, the control status register is set to an appropriate value depending on the type of exception (202). In addition, a check is performed to determine if there is an exception within an exception. The processor is forced into Kernel Mode and interrupts are disabled. The base exception vector address bit (BEV) is then checked (204), which determines the base address as shown in blocks 206 and 208. The process then checks to see if the fast interrupt is enabled (210) to determine the offset for the address. If the fast interrupt is enabled and signaled the offset is chosen, as shown in block 212, which swaps the exception registers ER(115:8) for the general purpose registers GP(115:8), as discussed in reference to FIGS. 2 and 3. If the fast interrupt is not enabled or not asserted, the exception may be handled in a conventional manner, shown as Cause.IV in block 214, which decides between the offsets shown in blocks 216 and 218. The program counter (PC), which is the address of the current instruction, is then the base, as determined at blocks 204 plus the offset as determined at blocks 210 and 214. The exception is then diverted to the appropriate vector.

Figure 5:
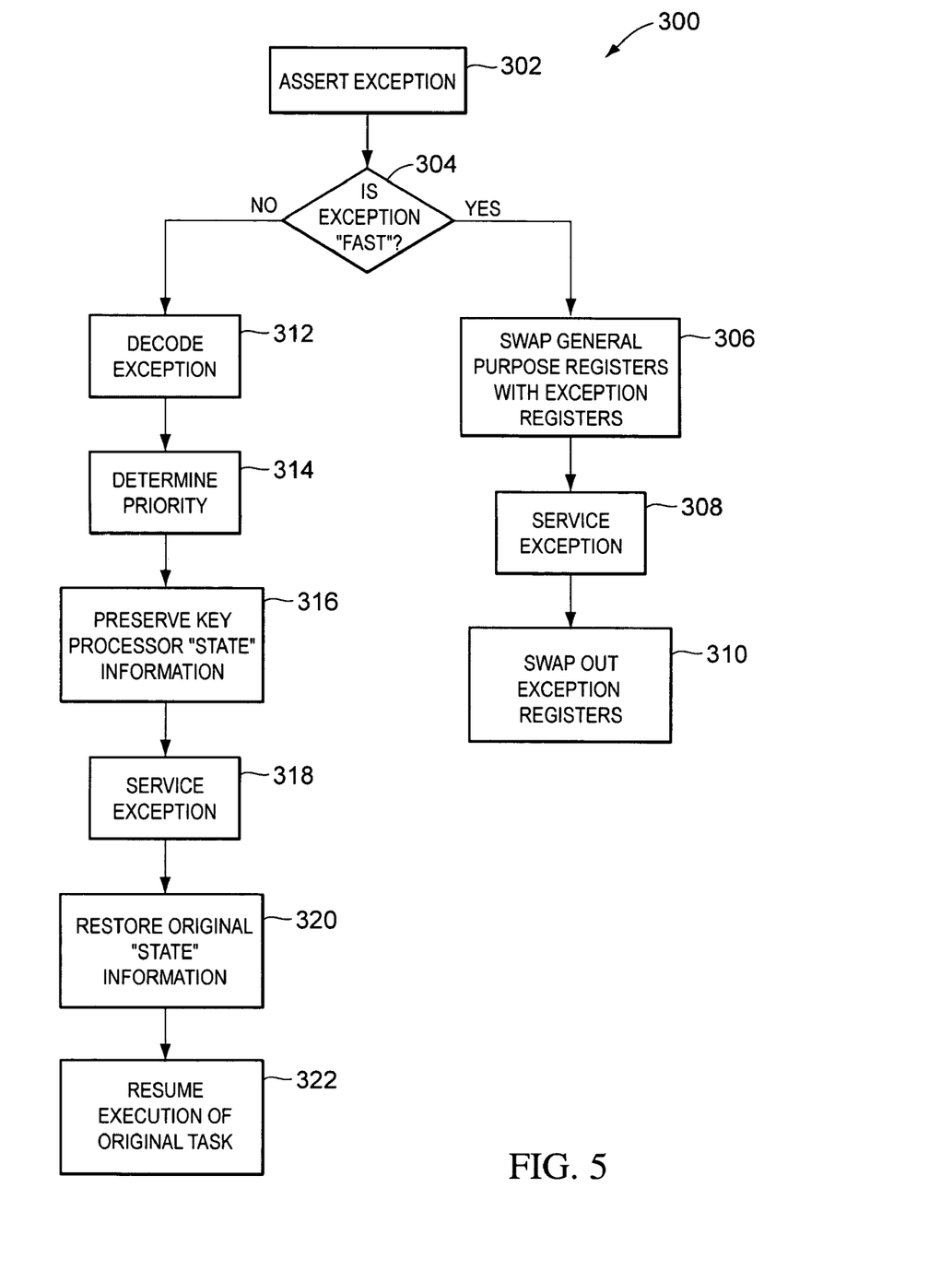
FIG. 5 is another flow chart showing the process of servicing an exception in accordance with an embodiment of the present invention

FIG. 5 is another flow chart showing the process 300 of servicing an exception in accordance with an embodiment of the present invention. Once the exception is asserted (302), the process determines whether the exception is designated as "fast" (304). As discussed above, this may be accomplished by recognizing that the feature is enabled (a bit is set in a control register) and looking at the exception, and thus does not require explicit software decoding of the exception. If the exception is "fast", a set of general purpose registers are swapped with a set of exception registers (306). The exception is then serviced (308), which is followed by swapping out the exception registers (310) and resuming execution of the original task.

If, on the other hand, the exception is not designated as "fast" as determined in step 304, the exception may be handled in a conventional manner. For example, as shown in FIG. 5, the exception is decoded (312), and priority is determined (314). The processor state information is preserved prior (316) prior to servicing the exception (318). Once the exception is serviced, the original state information is restored (320) and the execution of the original task is resumed (322). Of course, any desired method of handling the exception, including software techniques, may be used if the exception is not designated as "fast".

While the present invention has been described in connection with specific embodiments, one of ordinary skill in the art will recognize that various substitutions, modifications and combinations of the embodiments may be made after having reviewed the present disclosure without departing from the scope of the invention. The specific embodiments described above are illustrative only. Thus, the spirit and scope of the appended claims should not be limited to the foregoing description.

What is claimed is:

1. A processor comprising:
   a set of general purpose registers; and
   a set of dedicated exception registers that are switched for a subset of said set of general purpose registers during servicing of an exception, wherein said set of exception registers is substantially dedicated for servicing exceptions;
   wherein a portion of said set of exception registers is for servicing interrupts and another portion of said set of exception registers is for servicing operating system calls;
   wherein at least one general purpose register that is not switched to service exceptions is configured to allow access by said processor during said servicing of an exception.

2. The processor of claim 1, wherein said set of exception registers is for servicing exceptions having a high priority not for those exceptions having a low priority.

3. The processor of claim 1, wherein said processor provides a dedicated vector to said set of exception registers for said exception.

4. The processor of claim 1, wherein there are at least eight exception registers.

5. The processor of claim 1, wherein said processor provides a first dedicated vector to software which uses said portion of said set of exception registers for interrupts and a second dedicated vector to software which uses said another portion of said set of exception registers for servicing operating system calls.

6. The processor of claim 1, further comprising:
   a select logic circuit having a first input terminal that receives an exception register active bit and a second input terminal that receives a register address bit, said select logic circuit provides an output signal on an output terminal used to select between said set of general purpose registers and said exception registers.

7. A method of interrupting the execution of a task and servicing an exception in a processor, said method comprising:
   swapping a set of general purpose registers for at least one set of exception registers if an exception asserted at said processor is a high priority exception;
   servicing said exception using said at least one set of exception registers if said exception is a high priority exception;
   preserving information from the set of general purpose registers in a memory if said exception is a low priority exception; and
   swapping out said exception registers for said set of general purpose registers and resuming execution of said task if said exception is a high priority exception;
   wherein servicing said exception using said at least one set of exception registers comprises modifying the values of the registers in said set of exception registers without disrupting the state of the interrupted task; and
   wherein during servicing of an exception, a subset of said set of general purpose registers are not replaced with an alternate set and the subset of said set of general purpose registers that are not replaced with an alternate set allow data sharing between exception processing and normal execution.

8. A method of interrupting the execution of a task and servicing an exception in a processor, said method comprising:
   swapping a set of general purpose registers for at least one set of exception registers if an exception asserted at said processor is a high priority exception;
   servicing said exception using said at least one set of exception registers if said exception is a high priority exception;
   preserving information from the set of general purpose registers in a memory if said exception is a low priority exception; and
   swapping out said exception registers for said set of general purpose registers and resuming execution of said task if said exception is a high priority exception;
   wherein a portion of said set of exception registers is for servicing interrupts and another portion of said set of exception registers is for servicing operating system calls; and
   wherein during servicing of an exception, a subset of said set of general purpose registers are not replaced with an alternate set and the subset of said set of general purpose registers that are not replaced with an alternate set allow data sharing between exception processing and normal execution.

9. The method of claim 8, wherein said at least one set of exception registers is a dedicated set of exception registers.

10. The method of claim 8 wherein said servicing comprises providing a first vector and activating said at least one set of exception registers for said high priority exception, and wherein said providing comprises providing a second vector and not activating said set of exception registers for lower priority exceptions.

11. The method of claim 10, wherein said first vector is a dedicated vector and said providing said first vector automatically separates said high priority exception from said lower priority exceptions.

12. The method of claim 8, wherein servicing said exception using said at least one set of exception registers comprises modifying the values of the registers in said set of exception registers without disrupting the state of the interrupted task.

13. The method of claim 8, wherein said exception is a high priority exception and is either an interrupt or an operating system call, said method further comprising:
   providing a first vector and activating at least a portion of said exception registers for said high priority exception when said exception is an interrupt; providing a second vector and activating at least another portion of said exception registers for said high priority exception when said exception is an operating system call; and providing a third vector and not activating said set of exception registers for lower priority exceptions.

14. A method of interrupting the execution of a task and servicing an exception in a processor, said method comprising:
   swapping a set of general purpose registers for at least one set of exception registers if an exception asserted at said processor is a high priority exception;
   servicing said exception using said at least one set of exception registers if said exception is a high priority exception;
   preserving information from the set of general purpose registers in a memory if said exception is a low priority exception; and
   swapping out said exception registers for said set of general purpose registers and resuming execution of said task if said exception is a high priority exception;
   wherein said exception is a high priority exception and is either an interrupt or an operating system call, said method further comprising:
   providing a first vector and activating at least a portion of said exception registers for said high priority exception when said exception is an interrupt;
   providing a second vector and activating at least another portion of said exception registers for said high priority exception when said exception is an operating system call; and
   providing a third vector and not activating said set of exception registers for lower priority exceptions;
   wherein during servicing of an exception, a subset of said set of general purpose registers are not replaced with an alternate set and the subset of said set of general purpose registers that are not replaced with an alternate set allow data sharing between exception processing and normal execution.

15. The method of claim 14, wherein said first vector and said second vector are dedicated vectors and said providing said first vector and providing said second vector automatically separates said high priority exception from said lower priority exceptions.

16. An apparatus for executing tasks and servicing exceptions, said apparatus comprising:
   means for interrupting a task when an exception is asserted;
   means for servicing said exception without disrupting the state of the interrupted task, including means for activating at least one set of dedicated exception registers; and
   means for resuming execution of said interrupted task, including means for deactivating said dedicated exception registers and activating general purpose registers to resume execution of said task;
   wherein a portion of said set of exception registers is for servicing interrupts and another portion of said set of exception registers is for servicing operating system calls; and
   wherein during servicing of an exception, a subset of said set of general purpose registers are not replaced with an alternate set and the subset of said set of general purpose registers that are not replaced with an alternate set allow data sharing between exception processing and normal execution.

17. The apparatus of claim 16, wherein said means for activating comprises a first select logic circuit coupled to said set of general purpose registers and a second select logic circuit coupled to said at least one set of exception registers, said second select logic circuit receives an execution register active bit enabling said at least one set of exception registers and said second select logic circuit receives an inverted execution register active bit disabling said set of general purpose registers.

18. A processor comprising:
   a set of general purpose registers; and
   a set of dedicated exception registers that are switched for a subset of said set of general purpose registers only when an exception having at least a predetermined priority level is detected by said processor and that are not switched when an exception having a priority less than the predetermined priority level is detected by said processor;
   wherein a portion of said set of exception registers is for servicing interrupts and another portion of said set of exception registers is for servicing operating system calls;
   wherein at least one general purpose register that is not switched to service exceptions is configured to allow modification of the register states by said processor during said servicing of an exception.

19. The processor of claim 18 further comprising another set of dedicated exception registers that are switched for at least a subset of said set of general purpose registers only when another exception having at least said predetermined priority level is detected by the processor while said set if dedicated exception registers are switched for at least the subset of said set of general purpose registers.

20. The processor of claim 18 further comprising a select logic circuit having a first input that receives an exception register active bit and a second input that receives a register address bit, said select logic circuit provides an output signal on an output used to select between said set of general purpose registers and said exception registers.

21. The processor of claim 18 wherein said set of dedicated exception registers is switched only when an exception, of a first type, having at least a predetermined priority level is detected by said processor and the processor further comprising another set of dedicated exception registers that are switched for at least a subset of said set of general purpose registers only when another exception, of a second type, having at least said predetermined priority level is detected by the processor.

22. A processor comprising:
   a set of general purpose registers; and
   a set of dedicated exception registers that are switched for a subset of said set of general purpose registers only when an exception having at least a predetermined priority level is detected by said processor and that are not switched when an exception having a priority less than the predetermined priority level is detected by said processor;
   wherein a portion of said set of exception registers is for servicing interrupts and another portion of said set of exception registers is for servicing operating system calls;
   wherein at least one general purpose register that is not switched to service exceptions is configured to allow access by said processor during said servicing of an exception such that said processor can modify register states of said at least one general purpose register.

23. A processor comprising:
   a set of general purpose registers; and
   a set of dedicated exception registers that are switched for a subset of said set of general purpose registers during servicing of an exception, wherein said set of exception registers is substantially dedicated for servicing at least a subset of exceptions;

wherein a portion of said set of exception registers is for servicing interrupts and another portion of said set of exception registers is for servicing operating system calls;

wherein at least one general purpose register that is not switched to service exceptions is configured to be read and written directly by said processor during said servicing of an exception.

24. A processor comprising:

a set of general purpose registers; and a set of dedicated exception registers that are switched for a subset of said set of general purpose registers during servicing of an exception, wherein said set of exception registers is substantially dedicated for servicing at least a subset of exceptions;

wherein a portion of said set of exception registers is for servicing interrupts and another portion of said set of exception registers is for servicing operating system calls; and wherein during servicing of an exception, a subset of said set of general purpose registers are not replaced with an alternate set and the subset of said set of general purpose registers that are not replaced with an alternate set allow data sharing between exception processing and normal execution.

25. A processor comprising:

a set of general purpose registers; and a set of dedicated exception registers that are switched for a subset of said set of general purpose registers during servicing of an exception, wherein said set of exception registers is substantially dedicated for servicing at least a subset of exceptions;

wherein a portion of said set of exception registers is for servicing exceptions and another portion of said set of exception registers is for servicing operating system state and information calls;

wherein at least one general purpose register that is not switched to service exceptions is configured to be read and written directly by said processor during said servicing of an exception.

26. The processor of claim 25 wherein the portion of said set of exception registers for servicing exceptions is adapted to servicing interrupts.

27. A processor comprising:

a set of general purpose registers; and a set of dedicated exception registers that are switched for a subset of said set of general purpose registers during servicing of an exception, wherein said set of exception registers is substantially dedicated for servicing at least a subset of exceptions;

wherein a portion of said set of exception registers is for servicing exceptions and another portion of said set of exception registers is for servicing operating system state and information calls; and wherein during servicing of an exception, a subset of said set of general purpose registers are not replaced with an alternate set and the subset of said set of general purpose registers that are not replaced with an alternate set allow data sharing between exception processing and normal execution.

28. The processor of claim 27 wherein the portion of said set of exception registers for servicing exceptions is adapted to servicing interrupts.

29. A processor comprising:

a set of general purpose registers; and a set of dedicated exception registers that are switched for a subset of said set of general purpose registers during servicing of an exception, wherein said set of exception registers is substantially dedicated for servicing exceptions;

wherein a portion of said set of exception registers is for servicing interrupts and another portion of said set of exception registers is for servicing operating system calls; and wherein at least one general purpose register that is not switched to service exceptions is configured to be read and written directly by said processor during servicing of an exception.

* * * * *